United States Patent
Opshaug et al.

(10) Patent No.: US 11,658,855 B2
(45) Date of Patent: May 23, 2023

(54) POSITIONING REFERENCE SIGNAL MUTING PATTERNS

(71) Applicant: QUALCOMM Incorporated, San Diego, CA (US)

(72) Inventors: Guttorm Ringstad Opshaug, Redwood City, CA (US); Alexandros Manolakos, Escondido, CA (US); Sven Fischer, Nuremberg (DE); Sony Akkarakaran, Poway, CA (US); Arash Mirbagheri, San Diego, CA (US); Gokul Sridharan, Sunnyvale, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 231 days.

(21) Appl. No.: 17/092,961

(22) Filed: Nov. 9, 2020

(65) Prior Publication Data

US 2021/0152410 A1 May 20, 2021

Related U.S. Application Data

(60) Provisional application No. 62/936,465, filed on Nov. 16, 2019.

(51) Int. Cl.
*H04W 24/10* (2009.01)
*H04L 27/26* (2006.01)
*H04L 5/00* (2006.01)
*H04W 64/00* (2009.01)
*G01S 5/00* (2006.01)

(52) U.S. Cl.
CPC ........ *H04L 27/2613* (2013.01); *G01S 5/0036* (2013.01); *H04L 5/0051* (2013.01); *H04L 27/2607* (2013.01); *H04W 24/10* (2013.01); *H04W 64/00* (2013.01)

(58) Field of Classification Search
CPC ...... H04W 24/02; H04W 24/10; H04W 64/00
USPC ................ 370/329, 330, 350, 331, 336, 252
See application file for complete search history.

(56) References Cited

U.S. PATENT DOCUMENTS

| | | | |
|---|---|---|---|
| 9,148,818 B2* | 9/2015 | Yue | H04L 5/0051 |
| 9,743,384 B2* | 8/2017 | Nagata | H04W 72/04 |
| 10,064,216 B2* | 8/2018 | Nagata | H04L 5/0053 |
| 11,297,589 B2* | 4/2022 | Akkarakaran | G01S 5/0236 |
| 2012/0046030 A1* | 2/2012 | Siomina | G01S 1/20 |
| | | | 455/423 |

(Continued)

OTHER PUBLICATIONS

International Search Report and Written Opinion—PCT/US2020/059787—ISA/EPO—dated Feb. 9, 2021.

(Continued)

*Primary Examiner* — Joseph Arevalo
(74) *Attorney, Agent, or Firm* — Sunstein LLP

(57) ABSTRACT

A method, at a transmission/reception point (TRP), of producing a positioning reference signal muting pattern includes: obtaining, at the TRP, one or more positioning reference signal criteria, the one or more positioning reference signal criteria regarding at least one of positioning reference signal transmission or positioning reference signal reception; and producing, at the TRP, the positioning reference signal muting pattern such that the positioning reference signal muting pattern meets the one or more positioning reference signal criteria.

52 Claims, 8 Drawing Sheets

(56) References Cited

U.S. PATENT DOCUMENTS

| | | | | |
|---|---|---|---|---|
| 2014/0204853 A1* | 7/2014 | Ko | ................ | H04L 5/0048 |
| | | | | 370/329 |
| 2016/0119095 A1 | 4/2016 | Lee et al. | | |
| 2017/0251479 A1 | 8/2017 | Abdoli et al. | | |
| 2017/0289953 A1* | 10/2017 | Chae | ................ | G01S 5/10 |
| 2018/0054792 A1* | 2/2018 | Lee | ................ | H04B 17/24 |
| 2018/0287682 A1* | 10/2018 | Kwak | ................ | H04W 24/10 |
| 2019/0044584 A1* | 2/2019 | Lee | ................ | H04B 7/0617 |
| 2019/0174440 A1* | 6/2019 | Kwak | ................ | H04W 56/0015 |
| 2020/0245166 A1* | 7/2020 | Kwak | ................ | H04B 7/024 |
| 2020/0304192 A1* | 9/2020 | Yum | ................ | H04L 1/0069 |
| 2021/0044932 A1* | 2/2021 | Kim | ................ | H04W 4/029 |
| 2021/0051645 A1* | 2/2021 | Manolakos | ................ | H04W 72/0446 |
| 2021/0058889 A1* | 2/2021 | Zhang | ................ | H04W 4/029 |
| 2021/0112522 A1* | 4/2021 | Kim | ................ | H04L 5/0048 |
| 2021/0120522 A1* | 4/2021 | Kim | ................ | H04W 72/0453 |
| 2021/0243683 A1* | 8/2021 | Harada | ................ | H04W 88/14 |
| 2022/0026517 A1* | 1/2022 | Hasegawa | ................ | G01S 7/003 |
| 2022/0196780 A1* | 6/2022 | Dwivedi | ................ | H04W 72/0446 |

OTHER PUBLICATIONS

"3rd Generation Partnership Project, Technical Specification Group Radio Access Network, Study on Indoor Positioning Enhancements for UTRA and LTE (Release 13)", 3GPP Draft, TR37.857, V13.1.0, DRAFT37857-D10, 3rd Generation Partnership Project (3GPP), Mobile Competence Centre, 650, Route Des Lucioles, F-06921 Sophia-Antipolis Cedex, France, Dec. 15, 2015 (Dec. 15, 2015), XP051063636, pp. 1-82, section 7.1.1.1.3; p. 40 section 7.1.1.2.3; p. 54.

* cited by examiner

POSITIONING REFERENCE SIGNAL MUTING PATTERNS

CROSS-REFERENCE TO RELATED APPLICATION

This application claims the benefit of U.S. Provisional Application No. 62/936,465, filed Nov. 16, 2019, entitled "POSITIONING SIGNALS MUTING PATTERNS," which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax), fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

An example method, at a transmission/reception point (TRP), of producing a positioning reference signal muting pattern includes: obtaining, at the TRP, one or more positioning reference signal criteria, the one or more positioning reference signal criteria regarding at least one of positioning reference signal transmission or positioning reference signal reception; and producing, at the TRP, the positioning reference signal muting pattern such that the positioning reference signal muting pattern meets the one or more positioning reference signal criteria.

Implementations of such a method may include one or more of the following features. The method includes randomizing the positioning reference signal muting pattern to produce a randomized pattern. The method includes determining whether the randomized pattern meets the one or more positioning reference signal criteria. The method includes: determining that the randomized pattern fails to meet at least one of the one or more positioning reference signal criteria; and responding to determining that the randomized pattern fails to meet at least one of the one or more positioning reference signal criteria by discarding the randomized pattern or modifying the randomized pattern to produce a modified pattern that meets the one or more positioning reference signal criteria.

Also or alternatively, implementations of such a method may include one or more of the following features. The one or more positioning reference signal criteria include: the positioning reference signal muting pattern resulting in an expected probability of signal collisions below a threshold probability; or a first threshold quantity of unmuted positioning reference signals to enable receive antenna pattern training; or a second threshold quantity of unmuted positioning reference signals to enable a third threshold level of signal integration; or a combination of two or more of these. The one or more positioning reference signal criteria specify a muting pattern parameter indicative of a characteristic of muting and non-muting indicated by the positioning reference signal muting pattern. The muting pattern parameter specifies an amount of muted transmissions. The muting pattern parameter specifies an amount of consecutive muted transmissions. The muting pattern parameter specifies an amount of consecutive unmuted transmissions. The muting pattern parameter specifies a ratio of muted transmissions and unmuted transmissions. The muting pattern parameter specifies a threshold for muted transmissions or a threshold for unmuted transmissions. The muting pattern parameter specifies a measurement interval in which to have at least two identical unmuted transmissions.

Also or alternatively, implementations of such a method may include one or more of the following features. The one or more positioning reference signal criteria specify a muting pattern effect for the positioning reference signal muting pattern to have. Producing the positioning reference signal muting pattern includes producing a first binary bit sequence and producing a second binary bit sequence that is a cyclic shift of the first binary bit sequence.

An example transmission/reception point (TRP) for producing a positioning reference signal muting pattern includes: a memory; and a processor communicatively coupled to the memory and configured to: obtain one or more positioning reference signal criteria, the one or more positioning reference signal criteria regarding at least one of positioning reference signal transmission or positioning reference signal reception; and produce the positioning reference signal muting pattern such that the positioning reference signal muting pattern meets the one or more positioning reference signal criteria.

Implementations of such a TRP may include one or more of the following features. The processor is configured to randomize the positioning reference signal muting pattern to produce a randomized pattern. The processor is configured to determine whether the randomized pattern meets the one or more positioning reference signal criteria. The processor is configured to: determine that the randomized pattern fails to meet at least one of the one or more positioning reference signal criteria; and respond to the randomized pattern failing to meet at least one of the one or more positioning reference signal criteria by discarding the randomized pattern or modifying the randomized pattern to produce a modified pattern that meets the one or more positioning reference signal criteria.

Also or alternatively, implementations of such a TRP may include one or more of the following features. The one or more positioning reference signal criteria include: the positioning reference signal muting pattern resulting in an expected probability of signal collisions below a threshold probability; or a first threshold quantity of unmuted positioning reference signals to enable receive antenna pattern training; or a second threshold quantity of unmuted positioning reference signals to enable a third threshold level of signal integration; or a combination of two or more of these. The one or more positioning reference signal criteria specify a muting pattern parameter indicative of a characteristic of muting and non-muting indicated by the positioning reference signal muting pattern. The muting pattern parameter specifies an amount of muted transmissions. The muting pattern parameter specifies an amount of consecutive muted transmissions. The muting pattern parameter specifies an amount of consecutive unmuted transmissions. The muting pattern parameter specifies a ratio of muted transmissions and unmuted transmissions. The muting pattern parameter specifies a threshold for muted transmissions or a threshold for unmuted transmissions. The muting pattern parameter specifies a measurement interval in which to have at least two identical unmuted transmissions.

Also or alternatively, implementations of such a TRP may include one or more of the following features. The one or more positioning reference signal criteria specify a muting pattern effect for the positioning reference signal muting pattern to have. To produce the positioning reference signal muting pattern the processor is configured to produce a first binary bit sequence and to produce a second binary bit sequence that is a cyclic shift of the first binary bit sequence.

An example transmission/reception point (TRP) for producing a positioning reference signal muting pattern, the apparatus comprising: means for obtaining one or more positioning reference signal criteria, the one or more positioning reference signal criteria regarding at least one of positioning reference signal transmission or positioning reference signal reception; and means for producing the positioning reference signal muting pattern such that the positioning reference signal muting pattern meets the one or more positioning reference signal criteria.

Implementations of such a TRP may include one or more of the following features. The means for producing the positioning reference signal muting pattern include means for randomizing the positioning reference signal muting pattern to produce a randomized pattern. The means for producing the positioning reference signal muting pattern include means for determining whether the randomized pattern meets the one or more positioning reference signal criteria. The means for producing the positioning reference signal muting pattern include: means for determining that the randomized pattern fails to meet at least one of the one or more positioning reference signal criteria; and means for responding to determining that the randomized pattern fails to meet at least one of the one or more positioning reference signal criteria by discarding the randomized pattern or modifying the randomized pattern to produce a modified pattern that meets the one or more positioning reference signal criteria.

Also or alternatively, implementations of such a TRP may include one or more of the following features. The one or more positioning reference signal criteria include: the positioning reference signal muting pattern resulting in an expected probability of signal collisions below a threshold probability; or a first threshold quantity of unmuted positioning reference signals to enable receive antenna pattern training; or a second threshold quantity of unmuted positioning reference signals to enable a third threshold level of signal integration; or a combination of two or more of these. The one or more positioning reference signal criteria specify a muting pattern parameter indicative of a characteristic of muting and non-muting indicated by the positioning reference signal muting pattern. The muting pattern parameter specifies an amount of muted transmissions. The muting pattern parameter specifies an amount of consecutive muted transmissions. The muting pattern parameter specifies an amount of consecutive unmuted transmissions. The muting pattern parameter specifies a ratio of muted transmissions and unmuted transmissions. The muting pattern parameter specifies a threshold for muted transmissions or a threshold for unmuted transmissions. The muting pattern parameter specifies a measurement interval in which to have at least two identical unmuted transmissions.

Also or alternatively, implementations of such a TRP may include one or more of the following features. The one or more positioning reference signal criteria specify a muting pattern effect for the positioning reference signal muting pattern to have. The means for producing the positioning reference signal mating pattern are for producing a first binary bit sequence and producing a second binary bit sequence that is a cyclic shift of the first binary bit sequence.

An example non-transitory, processor-readable storage medium includes processor-readable instructions configured to cause a processor, of a transmission/reception point, to: obtain one or more criteria regarding at least one of positioning reference signal transmission or positioning reference signal reception; and produce a positioning reference signal muting pattern such that the positioning reference signal muting pattern meets the one or more criteria.

Implementations of such a storage medium may include one or more of the following features. The storage medium includes instructions configured to cause the processor to randomize the positioning reference signal muting pattern to produce a randomized pattern. The storage medium includes instructions configured to cause the processor to determine whether the randomized pattern meets the one or more criteria. The storage medium includes instructions configured to cause the processor to: determine that the randomized pattern fails to meet at least one of the one or more criteria; and respond to the randomized pattern failing to meet at least one of the one or more criteria by discarding the randomized pattern or modifying the randomized pattern to produce a modified pattern that meets the one or more criteria.

Also or alternatively, implementations of such a storage medium may include one or more of the following features. The one or more criteria include: the positioning reference signal muting pattern resulting in an expected probability of signal collisions below a threshold probability; or a first threshold quantity of unmuted positioning reference signals to enable receive antenna pattern training; or a second threshold quantity of unmuted positioning reference signals to enable a third threshold level of signal integration; or a combination of two or more of these. The one or more positioning reference signal criteria specify a mating pattern parameter indicative of a characteristic of muting and non-muting indicated by the positioning reference signal muting pattern. The muting pattern parameter specifies an amount of muted transmissions. The muting pattern parameter specifies an amount of consecutive muted transmissions. The muting pattern parameter specifies an amount of consecutive unmuted transmissions. The muting pattern parameter specifies a ratio of muted transmissions and unmuted transmissions. The muting pattern parameter specifies a threshold for muted transmissions or a threshold for unmuted transmissions. The muting pattern parameter specifies a measurement interval in which to have at least two identical unmuted transmissions.

Also or alternatively, implementations of such a storage medium may include one or more of the following features. The one or more positioning reference signal criteria specify a muting pattern effect for the positioning reference signal muting pattern to have. The instructions configured to cause the processor to produce the positioning reference signal muting pattern are configured to cause the processor to produce a first binary bit sequence and to produce a second binary bit sequence that is a cyclic shift of the first binary bit sequence.

DETAILED DESCRIPTION

Techniques are discussed herein for producing and implementing positioning reference signal muting patterns. For example, an apparatus such as a server obtains information regarding positioning reference signal transmission and/or reception. The apparatus may obtain the information through, e.g., measurements or programming. The information may include one or more criteria such as a parameter relating to muting or non-muting in a muting pattern and/or of one or more effects of the muting pattern. The apparatus produces a muting pattern to meet the one or more criteria. The apparatus may randomize the muting pattern over time and provide the muting pattern (before and/or after randomization) to one or more appropriate base stations and/or one or more user equipments (UEs), e.g., in response to the UEs requesting location service from the apparatus. Other configurations however, may be used.

Items and/or techniques described herein may provide one or more of the following capabilities, as well as other capabilities not mentioned. Collisions of positioning reference signals may be reduced. Transmission and reception of positioning reference signals may be regulated to meet one or more performance criteria (e.g., transmission criteria, reception criteria, collision avoidance criteria, etc.). Repeated collisions may be avoided between positioning reference signals and periodic or semi-persistent signals, including but not limited to different positioning reference signals and/or other reference signals or data from different TRPs, PSS/SSS/PBCH (SSB) from the same and/or different TRPs. Repeated positioning reference signal preemptions may be avoided. Other capabilities may be provided and not every implementation according to the disclosure must provide any, let alone all, of the capabilities discussed.

Figure 1:
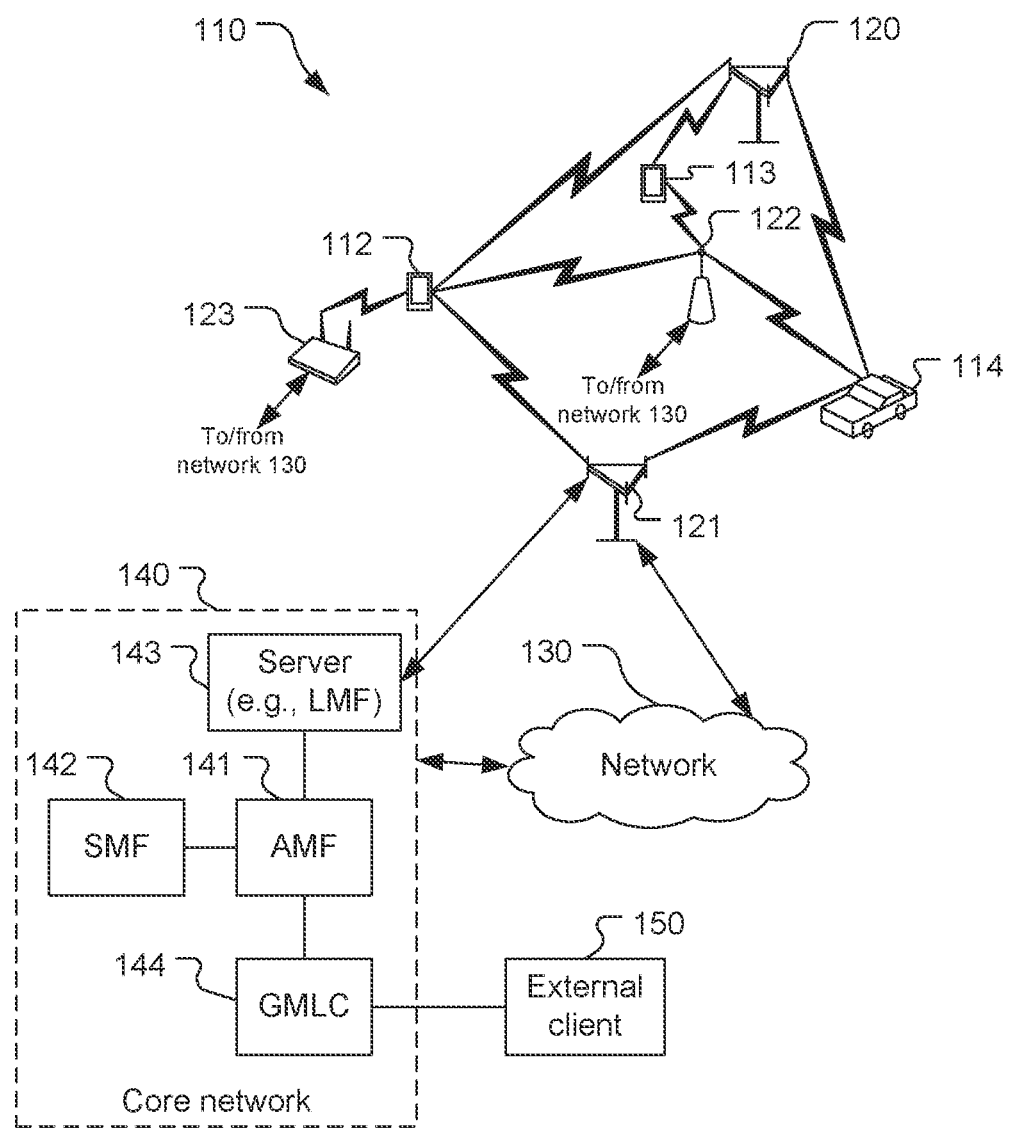
FIG. 1 is a simplified diagram of an example wireless communications system.

Referring to FIG. 1, an example wireless communications system 110 includes a user equipment (UE) 112, a UE 113, a UE 114, base transceiver stations (BTSs) 120, 121, 122, 123, a network 130, a core network 140, and an external client 150. The core network 140 (e.g., a 5G core network (5GC)) may include back-end devices including, among other things, an Access and Mobility Management Function (AMF) 141, a Session Management Function (SMF) 142, a server 143, and a Gateway Mobile Location Center (GMLC) 144. The AMF 141, the SMF 142, the server 143, and the GMLC 144 are communicatively coupled to each other. The server 143 may be, for example, a Location Management Function (LMF) that supports positioning of the UEs 112-114 (e.g., using techniques such as Assisted Global Navigation Satellite System (A-GNSS), OTDOA (Observed Time Difference of Arrival, e.g., Downlink (DL) OTDOA and/or Uplink (UL) OTDOA), Round Trip Time (RTT), RTT, RTK (Real Time Kinematic), PPP (Precise Point Positioning), DGNSS (Differential GNSS), E-CID (Enhanced Cell ID), AoA (Angle of Arrival), AoD (Angle of Departure), etc.).

An LMF may also be referred to as a Location Manager (LM), a Location Function (LF), a commercial LMF (CLMF), or a value-added LMF (VLMF). The server 143 (e.g., an LMF) and/or one or more other devices of the system 110 (e.g., one or more of the UEs 112-114) may be configured to determine locations of the UEs 112-114. The server 143 may communicate directly with the BTS 121 (e.g., a gNB) and/or one or more other BTSs, and may be integrated with the BTS 121 and/or one or more other BTSs. The SMF 142 may serve as an initial contact point of a Service Control Function (SCF) (not shown) to create, control, and delete media sessions. The server 143 (e.g., an LMF) may be co-located or integrated with a gNB or a TRP (Transmission/Reception Point), or may be disposed remotely from the gNB and/or the TRP and configured to communicate directly or indirectly with the gNB and/or the TRP.

The AMF 141 may serve as a control node that processes signaling between the UEs UEs 112-114 and the core network 140, and provides QoS (Quality of Service) flow and session management. The AMF 141 may support mobility of the UEs 112-114 including cell change and handover and may participate in supporting signaling connection to the UEs 112-114. The system 110 is capable of wireless communication in that components of the system 110 can communicate with one another (at least some times using wireless connections) directly or indirectly, e.g., via the BTSs 120-123 and/or the network 130 (and/or one or more other devices not shown such as one or more other base transceiver stations). For indirect communications, the communications may be altered during transmission from one entity to another, e.g., to alter header information of data packets to change format, etc. The UEs 112-114 shown are a smartphone, a tablet computer, and a vehicle-based device, but these are examples only as the UEs 112-114 are not required to be any of these configurations, and other configurations of UEs may be used. The UEs 112, 113 shown are mobile wireless communication devices (although they may communicate wirelessly and via wired connections) including mobile phones (including smartphones) and a tablet computer. The UE 114 shown is a vehicle-based mobile wireless communication device (although the UE 114 may communicate wirelessly and via wired connections). Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 110 and may communicate with each other and/or with the UEs 112-114, the BTSs 120-123, the network 130, the core network 140, and/or the external client 150. For example, such other devices may include internet of thing (IoT) devices, medical devices, home entertainment and/or automation devices, etc. The core network 140 may communicate with the external client 150 (e.g., a computer system), e.g., to allow the external client 150 to request and/or receive location information regarding the UEs 112-114 (e.g., via the GMLC 144).

The UEs 112-114 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 110 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 120-123 may wirelessly communicate with the UEs 112-114 in the system 110 via one or more antennas. A BTS may also be referred to as a base station, an access point, a gNode B (gNB), an access node (AN), a Node B, an evolved Node B (eNB), etc. For example, each of the BTSs 120, 121 may be a gNB or a transmission point gNB, the BTS 122 may be a macro cell (e.g., a high-power cellular base station) and/or a small cell (e.g., a low-power cellular base station), and the BTS 123 may be an access point (e.g., a short-range base station configured to communicate with short-range wireless technology such as WiFi, WiFi-Direct (WiFi-D), Bluetooth®, Bluetooth®-low energy (BLE), Zigbee, etc. One or more of the BTSs 120-123 may be configured to communicate with the UEs 112-114 via multiple carriers. Each of the BTSs 120, 121 may provide communication coverage for a respective geographic region, e.g. a cell. Each cell may be partitioned into multiple sectors as a function of the base station antennas.

The BTSs 120-123 each comprise one or more Transmission/Reception Points (TRPs), For example, each sector within a cell of a BTS may comprise a TRP, although multiple TRPs may share one or more components (e.g., share a processor but have separate antennas). The system 110 may include only macro TRPs or the system 110 may have TRPs of different types, e.g., macro, pico, and/or femto TRPs etc. A macro TRP may cover a relatively large geographic area (e.g., several kilometers in radius) and allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

The UEs 112-114 may be referred to as terminals, access terminals (ATs), mobile stations, mobile devices, subscriber units, etc. The UEs 112-114 may include various devices as listed above and/or other devices. The UEs 112-114 may be configured to connect indirectly to one or more communication networks via one or more device-to-device (D2D) peer-to-peer (P2P) The D2D P2P links may be supported with any appropriate D2D radio access technology (RAT), such as LTE Direct (LTE-D), WiFi Direct (WiFi-D), Bluetooth®, and so on. One or more of a group of the UEs 112-114 utilizing D2D communications may be within a geographic coverage area of a TRP such as one or more of the BTSs 120-123. Other UEs in such a group may be outside such geographic coverage areas, or be otherwise unable to receive transmissions from a base station. Groups of the UEs 112-114 communicating via D2D communications may utilize a one-to-many (1:M) system in which each UE may transmit to other UEs in the group. A TRP of the BTSs 120-123 may facilitate scheduling of resources for D2D communications. In other cases, D2D communications may be carried out between UEs without the involvement of a TRP.

Figure 2:
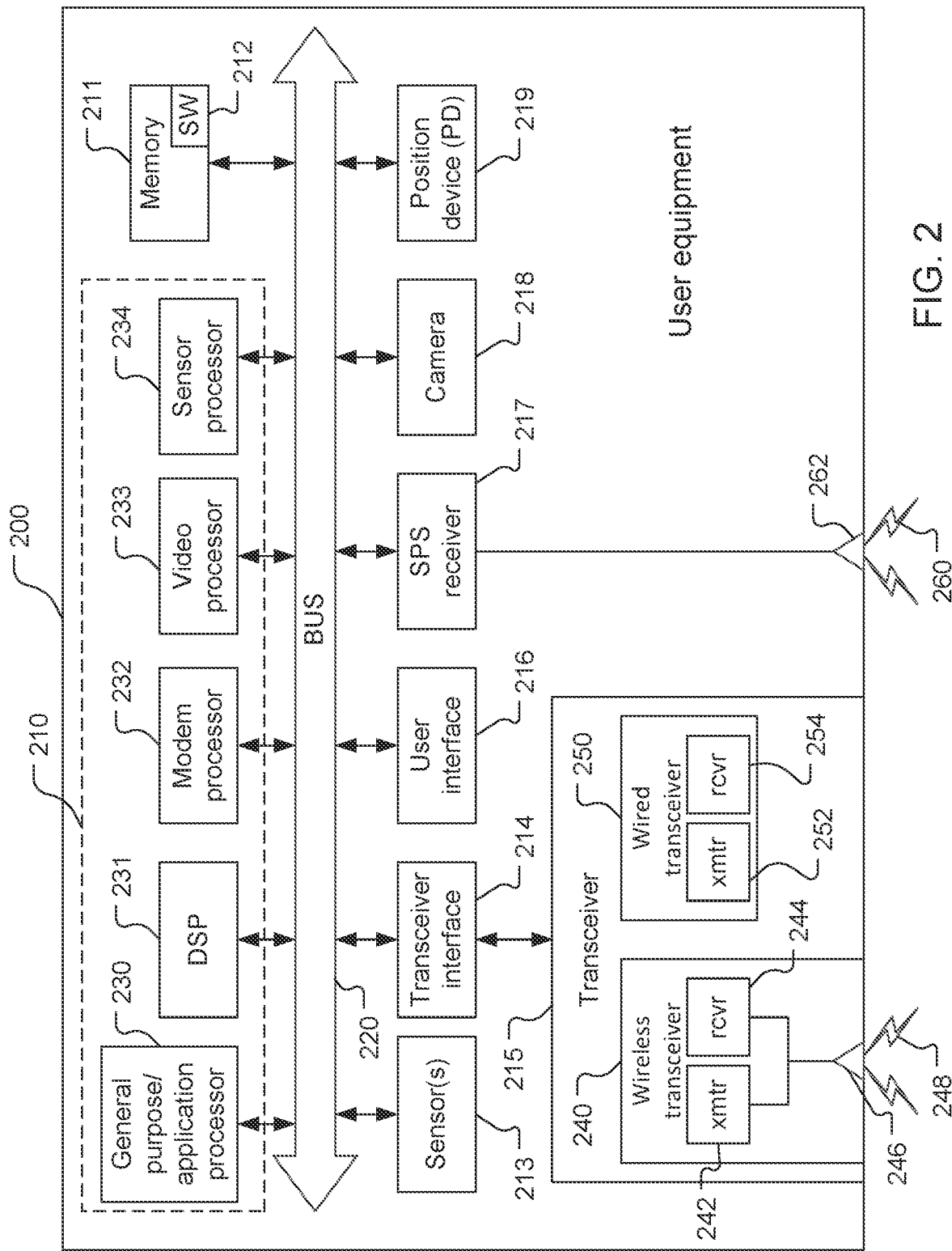
FIG. 2 is a block diagram of components of an example user equipment shown in FIG. 1.

Referring also to FIG. 2, a UE 200 is an example of one of the UEs 112-114 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the PD 219 may be communicatively coupled to each other by a bus 220 (which may be configured, e.g., for optical and/or electrical communication). One or more of the shown apparatus (e.g., the camera 218, the PD 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-2.34 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240, Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environmental sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes. The sensor(s) 213 may include one or more magnetometers to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 100 may be used in relative location measurements, relative location determination, motion determination, etc. Information detected by the sensor(s) 100 may be used for motion detection, relative displacement, dead reckoning, sensor-based location determination, and/or sensor-assisted location determination. The sensor(s) 100 may be useful to determine whether the UE 200 is fixed (stationary) or mobile and/or whether to report certain useful information to the server 143 regarding the mobility of the UE 200. For example, based on the information obtained/measured by the sensor(s), the UE 200 may notify/report to the server 143 that the UE 200 has detected movements or that the UE 200 has moved, and report the relative displacement/distance (e.g., via dead reckoning, or sensor-based location determination, or sensor-assisted location determination enabled by the sensor(s) 100). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting, (e.g., on one or more uplink channels) and/or receiving (e.g., on one or more downlink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc., New Radio may use mm-wave frequencies and/or sub-6 GHz frequencies. The wired transceiver 250 may include a transmitter 252 and a receiver 254 configured for wired communication, e.g., with the network 130 to send communications to, and receive communications from, the UE 200, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The PD 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3:
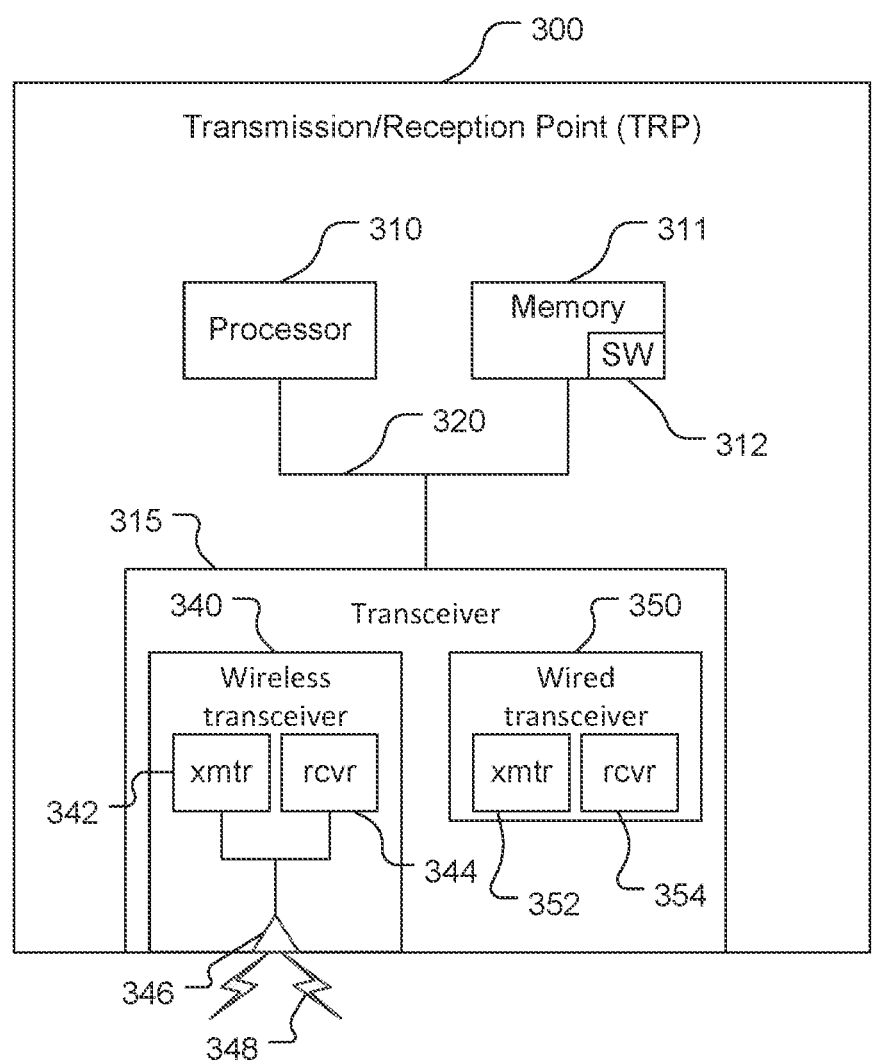
FIG. 3 is a block diagram of components of an example transmission/reception point shown in FIG. 1.
Figure 4:
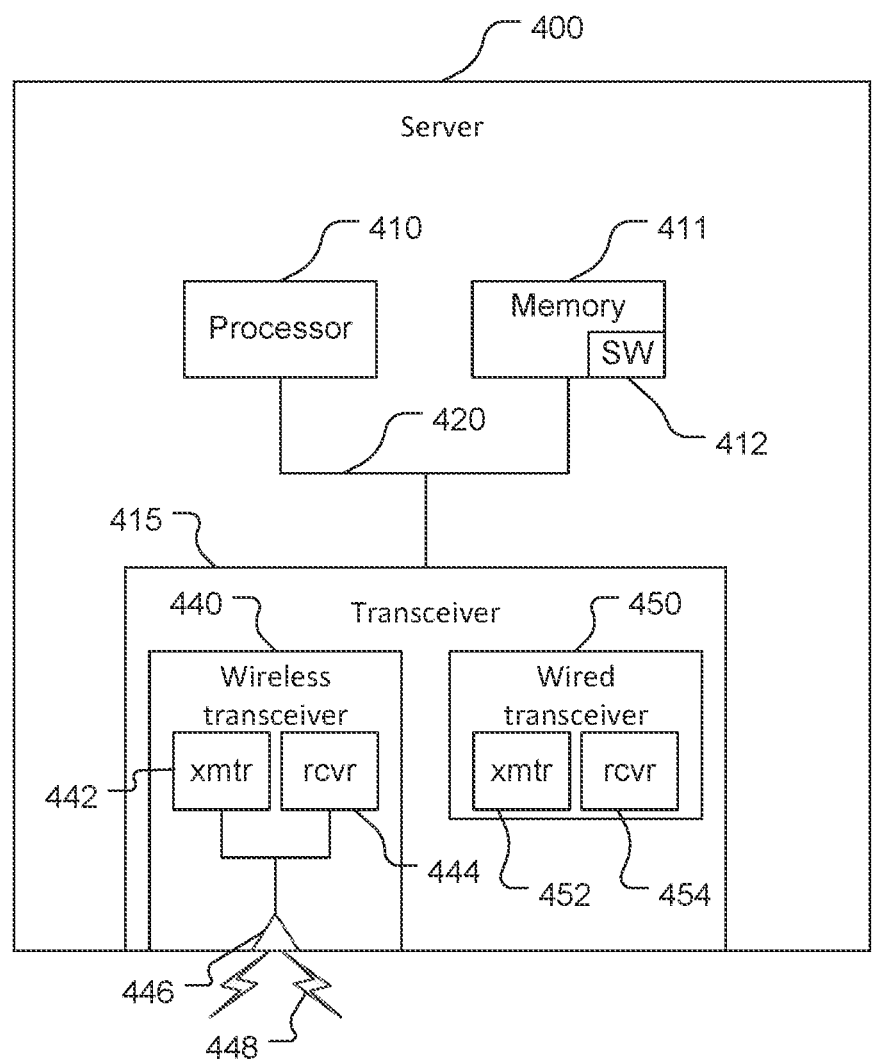
FIG. 4 is a block diagram of components of an example server shown in FIG. 1.

Referring also to FIG. 3, an example of a TRP 300 of the BTSs 120-123 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 4). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BTSs 120-123) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 130 to send communications to, and receive communications from, the server 143, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the server 143 and/or the UE 200 (i.e., the server 143 and/or the UE 200 may be configured to perform one or more of these functions).

Referring also to FIG. 4, a server 400, which is an example of the server 143, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 4). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels) and/or receiving (e.g., on one or more downlink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, Direct (WiFi-D), Bluetooth®, Zigbee etc. The wired transceiver 450 may include a transmitter 452 and a receiver 454 configured for wired communication, e.g., with the network 130 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the invention, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

One or more of many different positioning techniques (also called positioning methods) may be used to determine position of an entity such as one of the UEs 112-114. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb-size.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that can span multiple Physical Resource Blocks (PRBs) within N (one or more) consecutive symbol(s) within a slot. In an OFDM symbol, a PRS resource occupies consecutive PRBs. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting patter configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. In 5G multi-RTT, coordinated positioning may be used with the UE sending a single UL-SRS for positioning that is received by multiple TRPs instead of sending separate UL-SRS for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS signal in a PRS/SRS signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS signal pair may be transmitted from the TRP and the UE, respectively, within about 10 ms of each other. With SRS signals being sent by UEs, and with PRS and SRS signals being conveyed close in time to each other, it has been found that radio-frequency (RE) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

PRS Muting Patterns

The TRP 300 may be configured, e.g., by instructions received from the server 400 and/or by the software 312, to send downlink positioning reference signals (DL-PRS) per a schedule. According to the schedule, the TRP 300 may send the DL-PRS signals intermittently, e.g., periodically at a consistent interval from an initial transmission. The TRP 300 may be configured to send a DL-PRS signal at known times in a repeating sequence of resource sets. Each of the resource sets comprises multiple resources, with each resource being a beam transmitted by the TRP 300. Each beam transmits a DL-PRS signal and may repeat the transmission, with each transmission being called a repetition such that there may be multiple repetitions of the transmitted signal for a resource within an instance. An "instance" is a specified number of repetitions for each resource and a specified number of resources within the resource set such that once the specified number of repetitions are transmitted for each of the specified number of resources, the instance is complete. An instance may also be referred to as an "occasion." Further, each repetition may comprise one or more symbols of one or more slots of information sent by the TRP 300.

A PRS muting pattern may be represented by a bitmap (i.e., a bit string) indicating when a PRS is to be muted and when the PRS is not to be muted, and thus the term bitmap and the term muting pattern are used interchangeably herein. For example, a bit value of "1" may indicate not to mute the corresponding PRS signal(s) and a bit value of "0" may indicate to mute the corresponding PRS signal(s). The muting patterns may be inter-instance, in which case each bit in the bitmap indicates whether to mute all the PRS repetitions in the corresponding configurable number of instances, or intra-instance, in which case each bit in the bitmap indicates whether to mute a corresponding PRS repetition in an instance. Thus, for an example of inter-instance muting with a bitmap of 1010, the $0^{th}$ and $2^{nd}$ instances are not muted, and the $1^{st}$ and $3^{rd}$ instances are muted. For the same bitmap of 1010 but with intra-instance muting, the $0^{th}$ and $2^{nd}$ repetitions within each instance are not muted, and the $1^{st}$ and $3^{rd}$ repetitions in each instance are muted.

Figure 5:
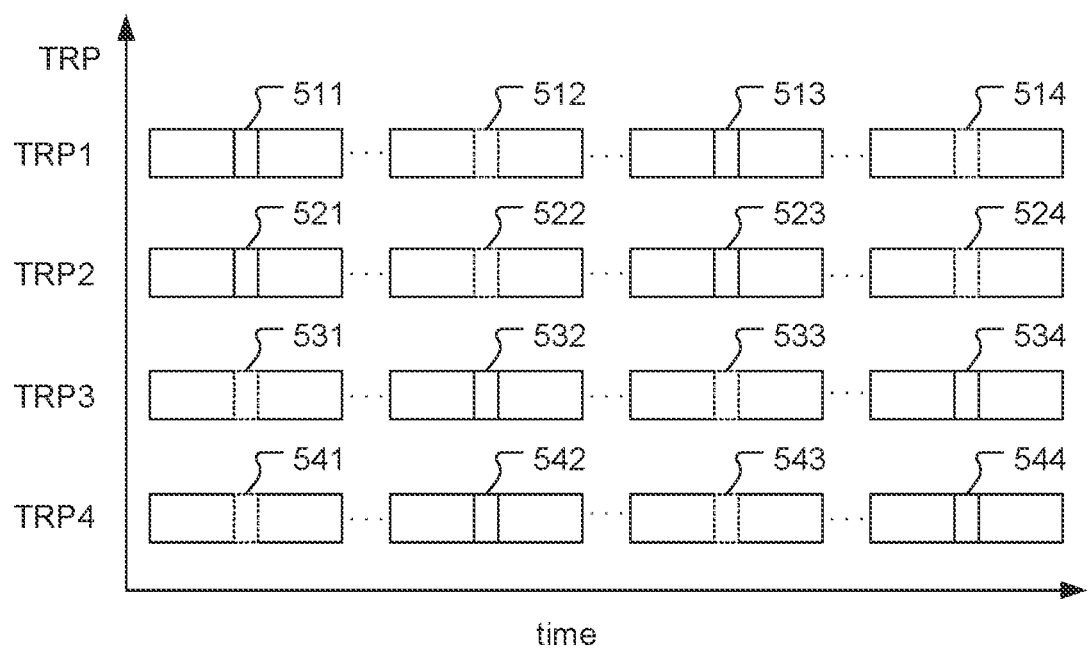
FIG. 5 is a timing diagram of muted and unmuted positioning reference signals conveyed between components of a wireless communications system such as that shown in FIG. 1.

Referring to FIG. 5, different muting patterns may be applied to different, e.g., neighboring, TRPs 300 to help reduce interference between the PRS signals. In this example, boxes represent signal transmissions by the TRPs, with portions of the boxes being for PRS signals, a PRS muting bitmap of 1010 is applied to TRP1 and TRP2, and a PRS muting bitmap of 0101 is applied to TRP3 and TRP4. Thus, in this example, PRS transmissions 511, 513 from TRP1 are not muted and PRS transmissions 512, 514 are muted (as indicated by dashed lines). Similarly, PRS transmissions 521, 523 from TRP2 are not muted and PRS transmissions 522, 524 are muted. Further, PRS transmissions 531, 533, 541, 543 from TRP3, TRP4, respectively, are muted and PRS transmissions 532, 534, 542, 544 are not muted. Each of the PRS transmissions may be a specific repetition (e.g. the first transmission in a batch of 4 repetitions) of a resource within an instance.

Figure 6:
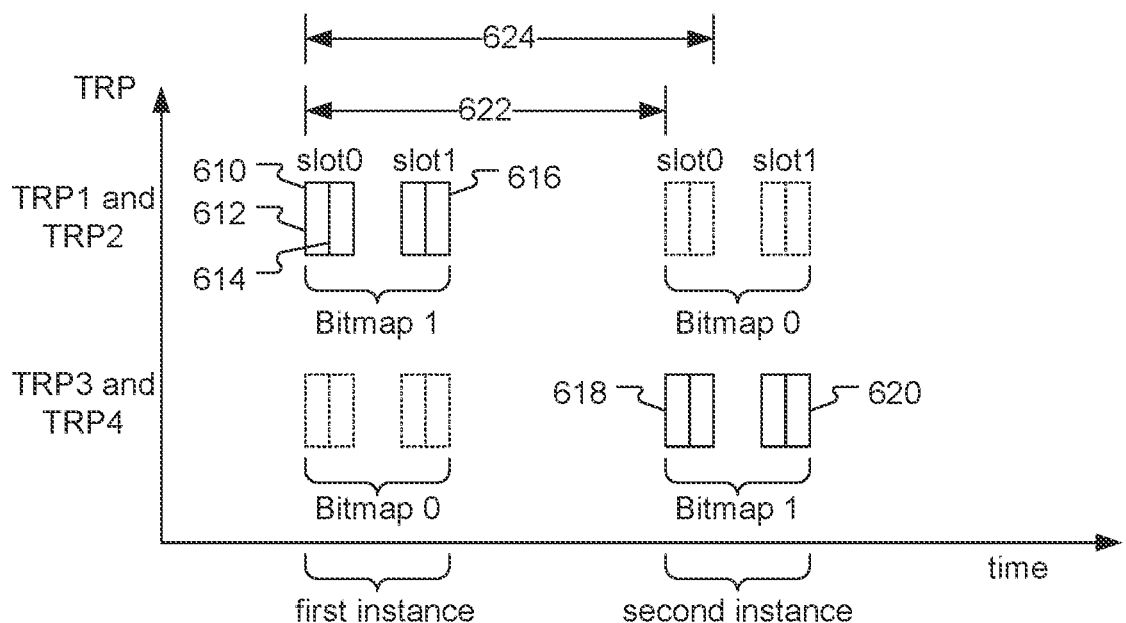
FIG. 6 is a timing diagram of inter-instance muted and unmuted positioning reference signals conveyed between components of a wireless communications system such as that shown in FIG. 1.

Numerous muting patterns may be used in combination with various scenarios of repetition quantity, symbols per repetition, and TRPs per repetition. Referring also to FIG. 6, an example is shown of an inter-instance, 2-bit PRS muting patterns for a scenario of comb-2 transmission, two symbols per repetition, and two repetitions per instance, A quantity of instances, e.g., consecutive instances, corresponding to each bit in the bitmap may be configurable. In this example the quantity of instances per bit is one instance to help simplify the example. Comb-2 indicates that in each repetition, the different TRPs are frequency-division multiplexed to use different subcarriers to transmit PRS signals such that the PRS signals from different TRPs transmitted concurrently are frequency orthogonal to help prevent collisions between the PRS signals. Further, the TRPs may switch subcarriers called staggering, for different symbols within a repetition to help fill holes in the frequency domain to help eliminate aliases in the time domain. For example, a repetition 610 comprising PRS signals sent from TRP1 and TRP2 includes a symbol 612 and a symbol 614, in the symbol 612, TRP1 may transmit TRP1's PRS signal using odd-numbered subcarriers and TRP2 may transmit TRP1's PRS signal using even-numbered subcarriers. In the symbol 614, TRP1 may transmit TRP1's PRS signal using even-numbered subcarriers and TRP2 may transmit TRP2's PRS signal using odd-numbered subcarriers. The two repetitions per instance in this example are transmitted in consecutive slots (slot0 and slot1) although this is not required.

The muting pattern shown in FIG. 6 comprises a 2-bit muting bitmap for each pair of TRPs. In this example, a value of "1." in the bitmap corresponds to transmitting the PRS signal(s) without muting unmuted)) and a value of "0" in the bitmap corresponds to muting the PRS signal(s) (i.e., the PRS signal transmission is muted). Muted PRS signals are shown in dotted lines in FIG. 6 and unmuted (non-muted) PRS signals are shown in solid lines. The TRP1 and TRP2 pair has a bitmap muting pattern of "10" and the TRP3 and TRP4 pair has a bitmap muting pattern of "01" in this example. While only one instance is shown corresponding to each hit in each bitmap, more than one instance may correspond to a bit in a bitmap, with the quantity of instances corresponding to a bit being configurable (e.g., by control information from the server 400). Thus, a bit in the bitmap may correspond to a configurable number of (consecutive) instances of a DL-PRS resource set in a periodic transmission of DL-PRS resource sets. In the inter-instance muting shown, all DL-PRS resources within a DL-PRS resource set instance are muted for a DL-PRS resource set instance that is indicated to be muted by the bitmap.

With the bitmaps shown, the TRPs TRP1 and TRP2 transmit PRS signals in both repetitions (the repetition 610 and a repetition 616) without muting during the first instance and have PRS signals muted during the second instance, and the TRPs TRP3 and TRP4 have PRS signals muted during the first instance and transmit PRS signals in both repetitions (repetitions 618, 620) without muting during the second instance. Beginnings of the first and second instances are separated in time by a periodicity 622, a value of which depends on parameters such as quantities of repetitions per instance and number of resources. The value of the periodicity 622 may be, for example, about 160 ms. The UE 200 measures PRS signals during the first and second instances to receive the PRS signals from all four of the TRPs TRP1, TRP2, TRP3, TRP4. The LIE 200 may use measurements of the repetitions 610, 616 and at least the repetition 618 (spanning a time window 624 equal to the periodicity 622 plus the time for the repetition 618) to acquire the PRS signals from all four of the TRPs TRP1, TRP2, TRP3, TRP4.

Figure 7:
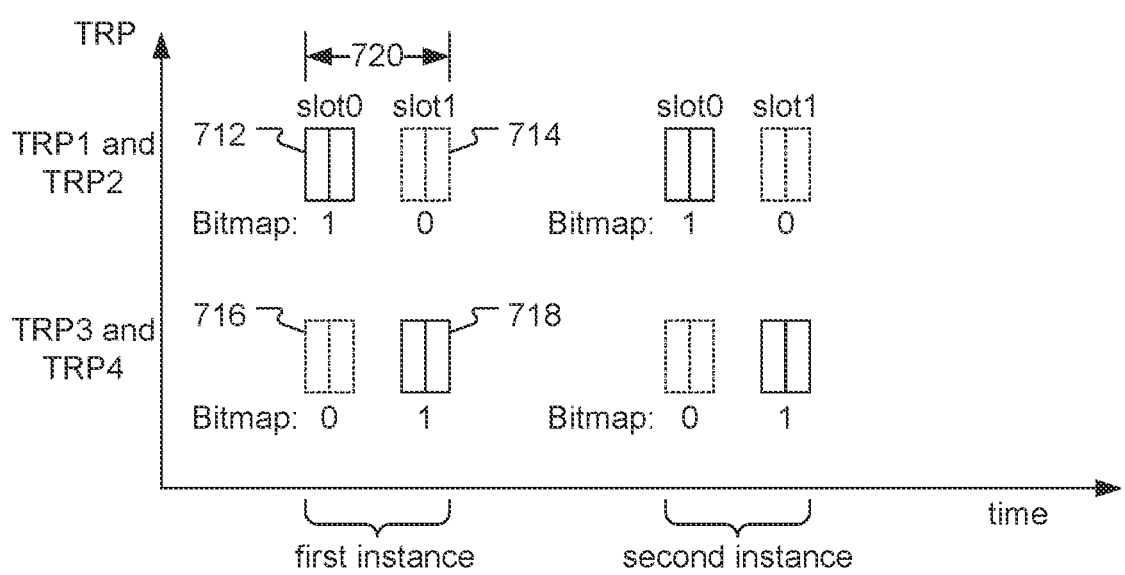
FIG. 7 are timing diagram of intra-instance muted and unmuted positioning reference signals conveyed between components of a wireless communications system such as that shown in FIG. 1.

Referring also to FIG. 7, an example is shown of an intra-instance, 2-bit PRS muting pattern for a scenario of comb-2 transmission, two symbols per repetition, and two repetitions per instance. Similar to the inter-instance example shown in FIG. 6, there are four TRPs transmitting respective comb-2 PRS signals of two symbols in length for each repetition. Each TRP is given a 2-bit muting bitmap, with each bit corresponding to a respective repetition in a respective instance. In this scenario, the PRS signals from TRP1 and TRP2 are not muted during a first repetition 712 during the first instance, and are muted during a second repetition 714 during the first instance. Conversely, the PRS signals from TRP3 and TRP4 are muted during a first repetition 716 during the first instance, and are not muted during a second repetition 718 during the first instance. A similar pattern is followed for the second instance as for the first instance. In this scenario, the UE 200 may measure PRS signals from all four of the TRPs in a time window 720 that spans the first instance.

The scenarios shown in FIGS. 6 and 7 are examples only and many other scenarios may be used. For example, bitmaps of other sizes may be used, e.g., 4 bits, 8 bits, 16 bits, 32 bits, etc. Thus, in an intra-instance scenario similar to FIG. 7, but with a bitmap of four bits, each bit may correspond to each of four repetitions in an instance. As another example, each of the four bits may correspond to each of the four repetitions over two instances, with portions of the muting pattern within different instances possibly being different (e.g., muting the first repetition in the first instance and the second repetition in the second instance and not muting the second repetition in the first instance and the first repetition in the second instance). Numerous muting patterns of repetitions within an instance may be used for different TRPs or sets of TRPs for intra-instance PRS muting scenarios. As another example, more than four TRPs may be transmitting PRS signals.

PRS Muting Pattern Production

The server 400 may be configured to produce (e.g., determine and make) and implement PRS muting patterns for multiple TRPs. The server 400 may produce a PRS muting pattern in a variety of manners. For example, the server 400 may select one or more predefined bitmap patterns. As another example, the server 400 may randomly generate values for a muting pattern One or more other techniques may be used to produce a muting pattern, and two or more techniques may be combined to produce a muting pattern starting with a stored, predefined bitmap and then altering, e.g., randomizing, the bitmap). One or more criteria may be used to guide the production of the bitmap and/or to determine whether a bitmap is acceptable, e.g., will yield one or more desired effects (e.g., results).

The server 400 may produce a PRS muting pattern by concatenating multiple bitmaps. For example the server 400 may add a bitmap to another bitmap to extend a PRS muting pattern. The server 400 may select a predefined starting bitmap that is well-balanced between muting and non-muting indications. For example, the starting bitmap may have muting and non-muting indications each within a range of 40%-60% of the total of the muting and non-muting indications, that is, no less than 40% muting indications and no more than 60% muting indications, and no less than 40% non-muting indications and no more than 60% non-muting indications. As other examples, the muting range of the starting bitmap may be between 30% and 50%, or between 45% and 55%, or another range. The percent of muting indications equals 100% minus the percent of non-muting indications and vice versa. As an example, the server 400 may start with a bitmap of four bits with two muting indications and two non-muting indications, then add another bitmap such as a randomly-generated 16-bit bitmap that meets specified criteria, then add one or more other bitmaps as appropriate. As another example, the server 400 may perform a logical or mathematical operation on a first bitmap to produce a second bitmap that the server 400 appends to the first bitmap. The server 400 could perform another logical or mathematical operation on the first bitmap, or perform the same or different logical or mathematical operation to the second bitmap, to produce a third bitmap that the server 400 appends to the second bitmap. As another example, the server 400 may perform another operation on a bitmap, such as a cyclic shift such that one sequence is a cyclic shift of another sequence. For example, the server 400 may perform a cyclic right-shift operation (e.g., to change a bitmap of 1101001 to 1110100) and/or a cyclic left-shift operation on one bitmap to produce another bitmap (e.g., to change 1101001 to 1010011). As another example, the server 400 may use multiple bitmaps to form another bitmap. For example, the server 400 may modify the bitmap of the scenario shown in FIG. 7 (scenario2) using the bitmap of the scenario shown in FIG. 6 (scenario1), e.g., reversing the bitmap values in scenario2 where a corresponding bitmap value in scenario1 is 1, and not reversing the values in scenario2 where the corresponding scenario1 bitmap value is 0. For example, where the scenario1 bitmap value for TRP1 and TRP2 is 1 (the first instance in FIG. 6), reverse the bitmap values of the corresponding instance in scenario2 (change the first instance pattern from 10 to 01), and where the scenario1 bitmap value for TRP1 and TRP2 is 0 (the second instance in FIG. 6), do not reverse the bitmap values of the corresponding instance in scenario2 (keep the FIG. 7 pattern of 10 for the second instance). In the example, a new pattern of 0110 would be produced.

The bitmap produced by the server 400 would be repeated by the appropriate TRP(s). The server 400 will typically provide a completed bitmap to each TRP 300. The server 400 could continue to add to the bitmap indefinitely, but will typically stop the bitmap at some finite length and provide this completed bitmap to the TRP 300. The server 400 may, however, modify the bitmap over time, e.g., by sending the TRP 300 a new bitmap or an instruction to alter the existing bitmap.

To produce a PRS muting pattern, the server 400 may consider one or more of a variety of criteria regarding positioning reference signal transmission and/or reception key performance indicators (KPIs)) for the PRS muting pattern to meet. The criteria may include one or more parameters indicative of one or more characteristics (e.g., ratios, thresholds, etc.) of the muting and non-muting indicated by the pattern and/or one or more effects of the muting pattern (e.g., one or more results of implementing the pattern, such as collisions, interference, etc.). For example, the server 400 may attempt to have PRS signals transmitted close together in time such that the PRS signals may be measured nearly concurrently over a measurement interval. DL-PRS configuration parameters available in 3GPP 37.355 are very flexible and the server 400 could choose virtually any configuration. In practical deployments, however, the server 400 may apply one or more constraints. The server 400 may try to keep the measurement interval small to help reduce impact of UE motion over the measurement interval. UE clock changes over the measurement interval, and/or TRP clock changes over the measurement interval. An example parameter may be a threshold quantity of unmuted transmissions or a threshold quantity of consecutive unmuted transmissions. Numerous other examples of parameters or other criteria are discussed herein. Some criteria are discussed with respect to one or more purposes, but the criteria are not limited to achieving the stated purpose(s) and may not achieve the stated purpose(s) and/or may achieve one or more other purposes.

As another example, the server 400 may try to keep a balance between muting and not muting PRS signals (e.g., a balance between 1's and 0's in a bitmap) to help ensure measurement of PRS signals without excessive delay (e.g., due to waiting for a next transmission). The server 400 may provide criteria for a muting pattern (e.g., a randomly-generated pattern) to have a quantity of bits with a certain value (e.g., eight bits of a 16-bit bitmap must be 1's, or five bits of an 8-bit bitmap must be 0's, e.g., with 1's indicating to transmit and 0's indicating to mute transmission), or to have a threshold quantity of bits have a certain value (e.g., at least three bits of an 8-bit bitmap must be 1's)), or to have a threshold percentage or a threshold ratio (e.g., at least 33% of bits must be 1's, or at least ⅜ of the bits must be 1's (i.e., ration of 1's to 0's must be ⅗ or higher)) or to have a ratio of bits of one value to bits of the other value. For example, the server 400 may provide one or more muting pattern parameters indicative of a balance between unmuted transmissions and muted transmissions, e.g., to help ensure a well-balanced a muting pattern. The server 400 may, for example, specify a range of muted transmissions or a range of unmuted transmissions such as a muted transmission range of 40%-60% of the total of the muted transmissions and unmuted transmissions, or a muted transmission range of 45%-55%, or other range. The percent of muted transmissions equals 100% minus the percent of unmuted transmissions and vice versa. As another example, the server 400 may specify a ratio of muted transmissions to unmuted transmissions (e.g., 1:1, or 2:3, etc.) or vice versa.

The server 400 may consider a desire to train a receive antenna pattern and/or a desire to help with signal integration in producing a PRS muting pattern. The server 400 may have a criterion for a bitmap to have a number of hits of the same value, e.g., indicating unmuted PRS signals, which may facilitate or enable training of one or more receive patterns and/or help with integration of a PRS signal, e.g., a weakly-received PRS signal. For example, a criterion may be that the muting pattern has a threshold quantity of unmuted positioning reference signal indications to enable receive antenna pattern training. As another example, a criterion may be that the muting pattern has a threshold quantity of unmuted positioning reference signal indications to enable a threshold level of signal integration (e.g., a threshold level of total power). As another example, a criterion may be a maximum distance (e.g., maximum number of slots) between on-bits (indications not to mute transmission). The UE 200 may observe the unmuted signal over multiple slots with the same antenna pattern and integrate the received signal, e.g., to help receive a PRS signal with poor SNR (signal-to-noise ratio), The UE 200 may observe the unmuted signal over different slots with different antenna patterns to determine which antenna pattern yielded the strongest received signal. This information may be used to train one or more antenna patterns, e.g., to improve PRS signal reception.

As another example, a criterion for a muting pattern might be that a certain position in a bitmap has a certain value (e.g., bit seven in a 16-bit bitmap must be "1"). The server 400 may disregard any bitmap produced that does not have the certain value in the certain position in the bitmap. A limitation may be placed on a certain position being a certain value with a specified frequency (e.g., the certain position has the certain value a specified percentage (e.g., 80%), or threshold percentage (e.g., no more than 90%, or at least 10%), or percentage range (e.g., between 30% and 75%)) of times that a bitmap is generated using the criterion that the certain position contains the certain value. The bitmap limitation may be for a specified frequency of times that a bitmap is applied to TRP transmissions, e.g., 70-80% of the times that a muting pattern is applied, position X has a value of 1, and 20-30% of the times position X has a value of 0.

Also or alternatively, the server 400 may try to manage timing of PRS signals to reduce collisions. The server 400 may try to manage timing of PRS signals to reduce collisions with other signals such as periodic signals that are transmitted repeatedly at the same time window (e.g., slot number(s), symbol number(s)). The server 400 may try to reduce collisions for PRS signals in symbols/slots that may be poorly suited for DL-PRS measurement. Some signals, such as an SSB (PSS/SSS/PBCH) (Synchronization Signal Block Primary Sync Signal/Secondary Sync Signal/Physical Broadcast Channel) may dominate a DL-PRS signal in a collision and thus the server 400 may try to avoid scheduling a PRS signal during a time window in which the SSB (PSS/SSS/PBCH) signal is sent. Some high-priority signals may be given transmission priority over a DL-PRS signal and if the high-priority signal repeatedly coincides with a transmission time of another signal such as a DL-PRS signal, then the DL-PRS signal may not be transmitted (and thus not received and/or processed) as often as desired. Techniques discussed herein (e.g., changing muting patterns over time, having muting patterns meet performance criteria, randomizing muting patterns over time, etc.) may help reduce collisions of and/or preemption of DL-PRS signal transmission.

The server 400 may consider expected mobility of one or more UEs in a coverage area of a TRP 300 for a PRS muting pattern. The server 400 may obtain information, e.g., measurements and/or indications of (e.g., summaries of, conclusions from) measurements, regarding a propagation environment to determine expected mobility. The server 400 (e.g., the memory 411) may be programmed with mobility information for TRPs (e.g., with a TRP 300 stationed near a highway being assigned a high expected mobility environment and a TRP stationed in a sports stadium being assigned a relatively low expected mobility environment). The server 400 may be configured to weight different key performance indicators (KPIs) differently for different use cases. For example, the server 400 may favor, e.g., weight more heavily, improved orthogonality (e.g., lack of PRS signals with the same frequency characteristics, e.g., same subcarriers) with a long measurement interval if little or no UE motion is expected, and favor a short measurement interval and/or intra-instance orthogonality if significant UE motion is expected. Thus, the server 400 may, for example, favor inter-instance PRS muting for low-mobility applications and may favor intra-instance PRS muting for high-mobility applications. The server 400 may disregard or otherwise not use a bitmap intended for a high-mobility environment where a measurement interval to be used is over a threshold amount of time. Similarly, if orthogonality is favored, the server 400 may disregard or otherwise not use a bitmap that would result in a likelihood of collisions exceeding a threshold likelihood (e.g., a frequency of expected collisions exceeding a threshold frequency).

The server 400 may produce the bitmap to achieve at least a desired SNR. The server 400 may use information provided by one or more UEs 200 and/or one or more TRPs 300 and/or stored in the memory 411 to determine effects on SNR of different PRS muting patterns and approve patterns that will result in an SNR above a threshold level.

Still other criteria may be considered in addition to, and/or instead of, the criteria discussed herein.

The server 400 is configured to obtain information relevant to the one or more criteria for the muting patterns. For example, the server 400 may obtain relevant information by receiving measurement information raw measurements and/or processed measurements) from one or more UEs 200, one or more TRPs 300, and/or from taking measurements. As another example, the server 400 may obtain relevant information by being programmed with, or otherwise storing, information relevant to the one or more criteria (e.g., whether a TRP 300 is in a high-mobility area or a low-mobility area (i.e., whether UEs in a coverage area of the TRP 300 are expected to have high mobility or low mobility). The server 400 may use the obtained information to determine one or more of the criteria (e.g., characteristic(s) of a muting pattern and/or performance of use of the muting pattern).

The server 400 may ensure compliance with PRS muting pattern criteria in multiple ways. The server 400 may apply one or more criteria for the PRS muting pattern as an input to an algorithm for producing a bitmap. Also or alternatively, the server 400 may analyze produced bitmaps against the one or more criteria, and for a bitmap that does not meet the criteria, either discard the bitmap or modify the bitmap to meet the criteria before causing the TRP 300 to implement the bitmap. Also or alternatively, the server 400 may analyze expected results (e.g., collisions, interference, etc.) of use of a bitmap to determine whether to use, modify, or discard the bitmap.

Figure 8:
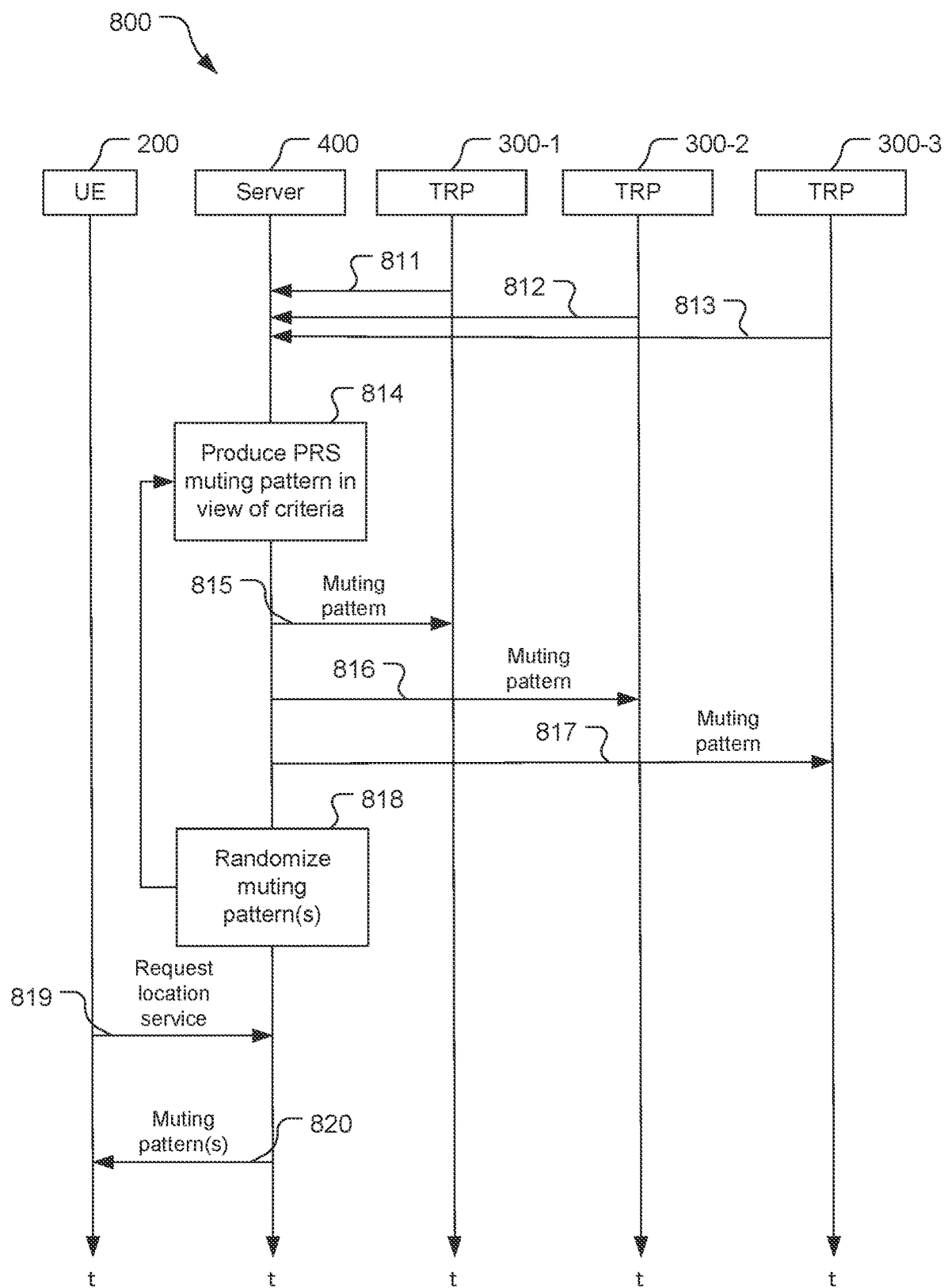
FIG. 8 is a communication and process flow for producing and implementing positioning reference signal muting patterns for components of a wireless communications system such as that shown in FIG. 1.

Referring also to FIG. 8, a signal and processing flow 800 shows communications between the UE 200, the server 400, and three TRPs 300-1, 300-2, 300-3, and processing by the server 400 to produce a PRS muting pattern. The signal and processing flow 800 includes messages and stages shown and is an example only and not limiting. The flow 800 may be altered, e.g., by having messages and/or stages added, removed, rearranged, combined, performed concurrently, and/or having one or more messages and/or stages split into multiple messages and/or stages.

The TRPs 300-1, 300-2, 300-3 may provide one or more messages 811, 812, 813 to the server 400 that may influence production of one or more PRS muting patterns. For example, one or more of the messages 811, 812, 813 may indicate a level of mobility of UEs in respective coverage areas of the TRPs 300-1, 300-2, 300-3. Also or alternatively, one or more of the messages 811, 812, 813 may indicate a request for assistance with training a respective receive antenna pattern of the respective TRP(s) 300-1, 300-2, 300-3.

At stage 814, the server 400 produces a PRS muting pattern, e.g., a bitmap, with appropriate characteristics in accordance with specified criteria. The criteria may be one or more criteria such as one or more parameters relating to muting or non-muting in a muting pattern and/or one or more effects of the muting pattern such as those discussed above regarding performance indications, facilitating antenna pattern training, balancing muting and non-muting, having one or more specified slots with specified values, helping to ensure orthogonality (e.g., reducing a probability of colliding with another signal to below a threshold probability), facilitating positioning in high-mobility environments, etc. The one or more criteria may be used to affect how a bitmap is produced (e.g., specifying to a random number generator (e.g., implemented by the processor 410) that only values of 1 or 0 are to be produced, and a specified quantity of 1's out of a total quantity of bits). Also or alternatively, the server 400 may produce a bitmap and then determine whether the one or more criteria are met by the bitmap. The server 400 may discard a bitmap that does not meet the one or more criteria or modify the bitmap so that the modified bitmap meets the one or more criteria.

The server 400 provides the appropriate PRS muting pattern to each of the TRPs 300-1, 300-2, 300-3, The server 400 sends the bitmap for the respective PRS muting pattern in messages 815, 816, 817 to the TRPs 300-1, 300-2, 300-3. Each of the TRPs 300-1, 300-2, 300-3 will use the respective PRS muting pattern to determine when to send a PRS signal (an unmuted PRS signal) and when not to send a PRS signal (a muted PRS signal). The TRPs 300-1, 300-2, 300-3 may repeat the respective muting patterns, e.g., until instructed otherwise by the server 400.

At stage 818, the server 400 may randomize the PRS muting pattern(s) for the TRPs 300-1, 300-2, 300-3. Randomizing the muting pattern(s) over time helps avoid repeated collisions that may occur by using the same muting pattern in the presence of a repeating, periodic signal. The flow 800 may return to the stage 814 for the server 400 to check the randomized muting pattern(s) against the desired criteria to help ensure that desired characteristics of the muting pattern(s) are met, e.g., to help ensure that desired qualities (e.g., SNR, orthogonality, antenna training ability, etc.) are achieved. The randomization may, however, override one or more criteria, at least occasionally. For example, if a specified bit is set to a specified value but a randomized muting pattern (bitmap) has a different value in the specified spot, then the randomized bitmap may be used without changing the value of the specified bit. The randomized bitmap(s) may be sent to the TRPs 300-1, 300-2, 300-3 in the messages 815-817.

The UE 200 may request location service from the server 400 in a message 819. The message 819 may be sent directly to the server 400 as shown, or may be sent to the server 400 indirectly via one or more of the TRPs 300-1, 300-2, 300-3. Although the request 819 is shown occurring after the stage 818 of randomizing one or more muting patterns, the UE 200 may send the request 819 at any time.

The server 400 may respond to the location service request 819 from the UE 200 by sending the appropriate muting pattern(s) to the UE 200 in a message 820. The server 400 sends the muting pattern(s) of the TRP(s) 300-1, 300-2, 300-3 in the vicinity of the UE 200 (e.g., a serving TRP and neighboring TRPs, or TRPs within a radius of a location estimate for the UE 200, etc.). The UE 200 may use the muting pattern(s) to save energy, by avoiding wasting power searching for signals during time windows during which the signals will not be sent and/or narrowing search time windows to windows of time indicated in the PRS muting pattern that the corresponding PRS signals will be sent unmuted.

Operation

Figure 9:
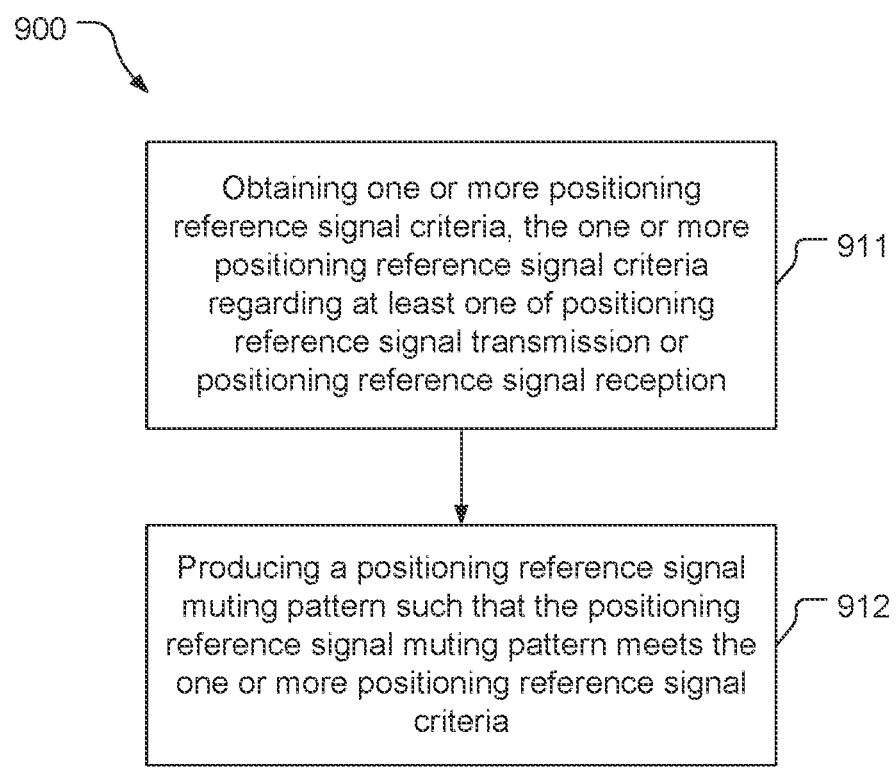
FIG. 9 is a block flow diagram of a method of producing and implementing a positioning reference signal muting pattern.

Referring to FIG. 9, with further reference to FIGS. 1-8, a method 900 of producing a positioning reference signal muting pattern includes the stages shown. The method 900 is, however, an example only and not limiting. The method 900 may be altered, e.g., by having stages added, removed, rearranged, combined, performed concurrently, and/or having single stages split into multiple stages. For example, one or more stages may occur before, and/or one or more stages may occur after, the stages shown in FIG. 9. For example, the muting pattern may be provided to a TRP 300 and used to determine when to transmit a PRS signal. Still other examples are possible, including other functions discussed below.

At stage 911, the method 900 includes obtaining one or more positioning reference signal criteria, the one or more positioning reference signal criteria regarding at least one of positioning reference signal transmission or positioning reference signal reception. The positioning reference signal may be a positioning reference signal sent wirelessly from a terrestrial-based TRP 300 of a position-determination system for mobile devices, e.g., that is part of a wireless communication system. The one or more positioning reference signal criteria are regarding (e.g., related to, affect, or intended to affect) positioning reference signal transmission or reception or both. The one or more positioning reference signal criteria may, for example, be related to desired and/or undesired times of transmission of a PRS signal by the TRP 300, amounts of transmission of the PRS signal by the TRP 300 (e.g., consecutively, per unit of time, etc.), balancing of transmitting and not transmitting the PRS signal, etc. The one or more positioning reference signal criteria may, for example, be related to desired and/or undesired times of reception of PRS signals, collision and/or preemption avoidance, ability to integrate PRS signals, ability to train receive antenna patterns, etc. The one or more positioning reference signal criteria may include a threshold for the number of consecutive muted positioning reference signal transmissions as this could impact response time through, e.g., time-to-fix or time-to-first-fix parameters. For example, a criterion may be a threshold maximum number of consecutive muted transmissions to help ensure that a signal is received within a threshold amount of time, e.g., with a threshold frequency). The one or more criteria may include a threshold for the number of consecutive unmuted positioning reference signal transmissions as this could impact response time through, e.g., time-to-fix or time-to-first-fix parameters. For example, a criterion may be a threshold minimum number of consecutive unmuted transmissions (e.g., to help ensure that a signal is able to be received and decoded). The one or more positioning reference signal criteria may include the positioning reference signal muting pattern resulting in an expected probability of signal collisions below a threshold probability. For example, the processor 410 (or the processor 310) may be able to analyze the muting pattern (and possibly other information, e.g., other muting patterns) to predict whether use of the muting pattern will result in an expected probability of signal collisions being below a threshold (acceptable) probability. The one or more positioning reference signal criteria specify a muting pattern parameter indicative of a characteristic of muting and non-muting indicated by the muting pattern. The muting pattern parameter may specify an amount of muted transmissions (e.g., an amount of consecutive muted transmissions), or an amount of unmuted transmissions, or a ratio of muted transmissions and unmuted transmissions, or a threshold for muted transmissions, or a threshold for unmuted transmissions, or a measurement interval in which to have at least two identical unmuted transmissions, etc. The one or more positioning reference signal criteria may include a threshold quantity of unmuted positioning reference signals to enable receive antenna pattern training. For example, the processor 410 (or the processor 310) may be configured to determine whether the mating pattern has a sufficient number of indications of unmuted positioning reference signals such that use of the muting pattern is expected to result (e.g., based on historical information and/or simulations) in sufficient (possibly consecutive) PRS signal transmissions for a LIE 200 receiving the PRS signal transmissions to train one or more receive antenna patterns of the UE 200. The one or more positioning reference signal criteria may include a quantity of unmuted positioning reference signals to enable a threshold level of signal integration. For example, the processor 410 (or the processor 310) may be configured to determine whether the muting pattern has a sufficient number of indications of unmuted positioning reference signals such that use of the mating pattern is expected to result (e.g., based on historical information and/or simulations) in sufficient PRS signal transmissions for a UE 200 receiving the PRS signal transmissions to integrate the received transmissions to a combined amount of energy above a threshold amount of energy. The one or more positioning signal criteria may specify a muting pattern effect for the muting pattern to have. The one or more positioning reference signal criteria may include one or more other criteria, whether or not discussed herein. The processor 410, possibly in combination with the memory 411 (e.g., the software 412) and possibly in combination with the transceiver 415 (e.g., the wireless receiver 444 and/or the wired receiver 454), may comprise means for obtaining the one or more positioning reference signal criteria. For example, the memory 411 may be programmed with one or more positioning reference signal criteria and/or the processor 410 may receive information from the TRP 300 and/or the UE 200 (via the TRP 300) from which the processor 410 may determine one or more of the one or inure positioning reference signal criteria. Also or alternatively, the processor 310, possibly in combination with the memory 311 (e.g., the software 312) and possibly in combination with the transceiver 315 (e.g., the wireless receiver 344 and/or the wired receiver 354), may comprise means for obtaining the one or inure positioning reference signal criteria. For example, the processor 310 may receive one or more positioning reference signal criteria from the server 400 and/or receive information from the UE 200 and/or the server 400 from which the processor 310 may determine one or more of the one or more positioning reference signal criteria.

At stage 912, the method 900 includes producing the positioning reference signal muting pattern such that the positioning reference signal muting pattern meets the one or more positioning reference signal criteria. The one or more positioning reference signal criteria may be, for example, the muting pattern itself or expected results of use of the muting pattern, e.g., by the TRP 300 for transmitting PRS signals and/or by the UE 200 for receiving and measuring PRS signals. The processor 410, possibly in combination with the memory 411 (e.g., the software 412), may comprise means for producing a positioning reference signal muting pattern. Similarly, the processor 310, possibly in combination with the memory 311 (e.g., the software 312), may comprise means for producing a positioning reference signal muting pattern. For example, the processor 410 (or the processor 310) may select a bitmap, generate a bit map applying any appropriate criteria (e.g., ratio of 1's and 0's in a binary bitmap), append to an existing bitmap, etc., and analyze the bitmap to determine whether one or more other criteria (if any) are met (e.g., criteria regarding expected performance (e.g., PRS signal reception) with use of the bitmap (e.g., by the TRP 300 to determine when to send a PRS signal).

The method 900 may include one or more of the following features. For example, the method 900 may include randomizing the positioning reference signal muting pattern to produce a randomized pattern. Randomizing the pattern may help reduce repeated collisions and/or preemptions of positioning reference signals, Numerous techniques may be used to randomize the muting pattern, e.g., right-shifting the muting pattern, left-shifting the muting pattern, using a random number generator or pseudo-random number generator to produce one or more values for one or more bit locations in a bitmap, etc. The method 900 may include determining whether the randomized pattern meets the one or more positioning reference signal criteria. The processor 410 (or the processor 310) possibly in combination with the memory 411 (or the memory 311) may comprise means for randomizing the positioning reference signal muting pattern and means for determining whether the randomized pattern meets the one or more positioning reference signal criteria. The method 900 may include determining that the randomized pattern fails to meet at least one of the one or more positioning reference signal criteria and in response, discarding the randomized pattern or modifying the randomized pattern to produce a modified pattern that meets the one or more positioning reference signal criteria. For example, the processor 410 (or the processor 310) may delete, disregard, or otherwise not use a randomized muting pattern that fails one or more of the one or more positioning reference signal criteria. As another example, the processor 410 (or the processor 310) may randomize the randomized pattern to produce a re-randomized pattern and check the re-randomized pattern for satisfaction of the one or more positioning reference signal criteria and use the re-randomized pattern if the one or more positioning reference signal criteria are met and discard or further modify the re-randomized pattern otherwise.

Also or alternatively, the method 900 may include one or more of the following features. Producing the positioning reference signal muting pattern may comprise producing a first binary bit sequence and producing a second binary bit sequence that is a cyclic shift of the first bit sequence.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the server 400 (e.g., for determining and implementing PRS muting patterns) may be performed outside of the server 400 such as by the TRP 300.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C car AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forty's, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method, at a transmission/reception point (TRP), of producing a positioning reference signal muting pattern, the method comprising:
   obtaining, at the TRP, one or more positioning reference signal criteria, the one or more positioning reference signal criteria regarding at least one of positioning reference signal transmission or positioning reference signal reception; and
   producing, at the TRP, the positioning reference signal muting pattern such that the positioning reference signal muting pattern meets the one or more positioning reference signal criteria;
   wherein the one or more positioning reference signal criteria specify a muting pattern parameter indicative of a characteristic of muting and non-muting indicated by the positioning reference signal muting pattern.

2. The method of claim 1, further comprising randomizing the positioning reference signal muting pattern to produce a randomized pattern.

3. The method of claim 2, further comprising determining whether the randomized pattern meets the one or more positioning reference signal criteria.

4. The method of claim 3, further comprising:
   determining that the randomized pattern fails to meet at least one of the one or more positioning reference signal criteria; and
   responding to determining that the randomized pattern fails to meet at least one of the one or more positioning reference signal criteria by discarding the randomized pattern or modifying the randomized pattern to produce a modified pattern that meets the one or more positioning reference signal criteria.

5. The method of claim 1, wherein the one or more positioning reference signal criteria include:

the positioning reference signal muting pattern resulting in an expected probability of signal collisions below a threshold probability; or a first threshold quantity of unmuted positioning reference signals to enable receive antenna pattern training; or a second threshold quantity of unmuted positioning reference signals to enable a third threshold level of signal integration; or a combination of two or more of these.

6. The method of claim 1, wherein the muting pattern parameter specifies an amount of muted transmissions.

7. The method of claim 6, wherein the muting pattern parameter specifies an amount of consecutive muted transmissions.

8. The method of claim 1, wherein the muting pattern parameter specifies an amount of consecutive unmuted transmissions.

9. The method of claim 1, wherein the muting pattern parameter specifies a ratio of muted transmissions and unmuted transmissions.

10. The method of claim 1, wherein the muting pattern parameter specifies a threshold for muted transmissions or a threshold for unmuted transmissions.

11. The method of claim 1, wherein the muting pattern parameter specifies a measurement interval in which to have at least two identical unmuted transmissions.

12. The method of claim 1, wherein the one or more positioning reference signal criteria specify a muting pattern effect for the positioning reference signal muting pattern to have.

13. The method of claim 1, wherein producing the positioning reference signal muting pattern comprises producing a first binary bit sequence and producing a second binary bit sequence that is a cyclic shift of the first binary bit sequence.

14. A transmission/reception point (TRP) for producing a positioning reference signal muting pattern, the apparatus comprising:

a memory; and a processor communicatively coupled to the memory and configured to:

obtain one or more positioning reference signal criteria, the one or more positioning reference signal criteria regarding at least one of positioning reference signal transmission or positioning reference signal reception; and produce the positioning reference signal muting pattern such that the positioning reference signal muting pattern meets the one or more positioning reference signal criteria;

wherein the one or more positioning reference signal criteria specify a muting pattern parameter indicative of a characteristic of muting and non-muting indicated by the positioning reference signal muting pattern.

15. The TRP of claim 14, wherein the processor is configured to randomize the positioning reference signal muting pattern to produce a randomized pattern.

16. The TRP of claim 15, wherein the processor is configured to determine whether the randomized pattern meets the one or more positioning reference signal criteria.

17. The TRP of claim 16, wherein the processor is configured to:

determine that the randomized pattern fails to meet at least one of the one or more positioning reference signal criteria; and respond to the randomized pattern failing to meet at least one of the one or more positioning reference signal criteria by discarding the randomized pattern or modifying the randomized pattern to produce a modified pattern that meets the one or more positioning reference signal criteria.

18. The apparatus of claim 14, wherein the one or more positioning reference signal criteria include:

the positioning reference signal muting pattern resulting in an expected probability of signal collisions below a threshold probability; or a first threshold quantity of unmuted positioning reference signals to enable receive antenna pattern training; or a second threshold quantity of unmuted positioning reference signals to enable a third threshold level of signal integration; or a combination of two or more of these.

19. The TRP of claim 14, wherein the muting pattern parameter specifies an amount of muted transmissions.

20. The TRP of claim 19, wherein the muting pattern parameter specifies an amount of consecutive muted transmissions.

21. The TRP of claim 14, wherein the muting pattern parameter specifies an amount of consecutive unmuted transmissions.

22. The TRP of claim 14, wherein the muting pattern parameter specifies a ratio of muted transmissions and unmuted transmissions.

23. The TRP of claim 14, wherein the muting pattern parameter specifies a threshold for muted transmissions or a threshold for unmuted transmissions.

24. The TRP of claim 14, wherein the muting pattern parameter specifies a measurement interval in which to have at least two identical unmuted transmissions.

25. The TRP of claim 14, wherein the one or more positioning reference signal criteria specify a muting pattern effect for the positioning reference signal muting pattern to have.

26. The TRP of claim 14, wherein to produce the positioning reference signal muting pattern the processor is configured to produce a first binary bit sequence and to produce a second binary bit sequence that is a cyclic shift of the first binary bit sequence.

27. A transmission/reception point (TRP) for producing a positioning reference signal muting pattern, the apparatus comprising:

means for obtaining one or more positioning reference signal criteria, the one or more positioning reference signal criteria regarding at least one of positioning reference signal transmission or positioning reference signal reception; and means for producing the positioning reference signal muting pattern such that the positioning reference signal muting pattern meets the one or more positioning reference signal criteria;

wherein the one or more positioning reference signal criteria specify a muting pattern parameter indicative of a characteristic of muting and non-muting indicated by the positioning reference signal muting pattern.

28. The TRP of claim 27, wherein the means for producing the positioning reference signal muting pattern comprise means for randomizing the positioning reference signal muting pattern to produce a randomized pattern.

29. The TRP of claim 28, wherein the means for producing the positioning reference signal muting pattern comprise means for determining whether the randomized pattern meets the one or more positioning reference signal criteria.

30. The TRP of claim 29, wherein the means for producing the positioning reference signal muting pattern comprise:
  means for determining that the randomized pattern fails to meet at least one of the one or more positioning reference signal criteria; and
  means for responding to determining that the randomized pattern fails to meet at least one of the one or more positioning reference signal criteria by discarding the randomized pattern or modifying the randomized pattern to produce a modified pattern that meets the one or more positioning reference signal criteria.

31. The TRP of claim 27, wherein the one or more positioning reference signal criteria include:
  the positioning reference signal muting pattern resulting in an expected probability of signal collisions below a threshold probability; or
  a first threshold quantity of unmuted positioning reference signals to enable receive antenna pattern training; or
  a second threshold quantity of unmuted positioning reference signals to enable a third threshold level of signal integration; or
  a combination of two or more of these.

32. The TRP of claim 27, wherein the muting pattern parameter specifies an amount of muted transmissions.

33. The TRP of claim 32, wherein the muting pattern parameter specifies an amount of consecutive muted transmissions.

34. The TRP of claim 27, wherein the muting pattern parameter specifies an amount of consecutive unmuted transmissions.

35. The TRP of claim 27, wherein the muting pattern parameter specifies a ratio of muted transmissions and unmuted transmissions.

36. The TRP of claim 27, wherein the muting pattern parameter specifies a threshold for muted transmissions or a threshold for unmuted transmissions.

37. The TRP of claim 27, wherein the muting pattern parameter specifies a measurement interval in which to have at least two identical unmuted transmissions.

38. The TRP of claim 27, wherein the one or more positioning reference signal criteria specify a muting pattern effect for the positioning reference signal muting pattern to have.

39. The TRP of claim 27, wherein the means for producing the positioning reference signal muting pattern are for producing a first binary bit sequence and producing a second binary bit sequence that is a cyclic shift of the first binary bit sequence.

40. A non-transitory, processor-readable storage medium comprising processor-readable instructions configured to cause a processor, of a transmission/reception point, to:
  obtain one or more criteria regarding at least one of positioning reference signal transmission or positioning reference signal reception; and
  produce a positioning reference signal muting pattern such that the positioning reference signal muting pattern meets the one or more criteria;
  wherein the one or more positioning reference signal criteria specify a muting pattern parameter indicative of a characteristic of muting and non-muting indicated by the positioning reference signal muting pattern.

41. The storage medium of claim 40, further comprising instructions configured to cause the processor to randomize the positioning reference signal muting pattern to produce a randomized pattern.

42. The storage medium of claim 41, further comprising instructions configured to cause the processor to determine whether the randomized pattern meets the one or more criteria.

43. The storage medium of claim 42, further comprising instructions configured to cause the processor to:
  determine that the randomized pattern fails to meet at least one of the one or more criteria; and
  respond to the randomized pattern failing to meet at least one of the one or more criteria by discarding the randomized pattern or modifying the randomized pattern to produce a modified pattern that meets the one or more criteria.

44. The storage medium of claim 40, wherein the one or more criteria include:
  the positioning reference signal muting pattern resulting in an expected probability of signal collisions below a threshold probability; or
  a first threshold quantity of unmuted positioning reference signals to enable receive antenna pattern training; or
  a second threshold quantity of unmuted positioning reference signals to enable a third threshold level of signal integration; or
  a combination of two or more of these.

45. The storage medium of claim 40, wherein the muting pattern parameter specifies an amount of muted transmissions.

46. The storage medium of claim 45, wherein the muting pattern parameter specifies an amount of consecutive muted transmissions.

47. The storage medium of claim 40, wherein the muting pattern parameter specifies an amount of consecutive unmuted transmissions.

48. The storage medium of claim 40, wherein the muting pattern parameter specifies a ratio of muted transmissions and unmuted transmissions.

49. The storage medium of claim 40, wherein the muting pattern parameter specifies a threshold for muted transmissions or a threshold for unmuted transmissions.

50. The storage medium of claim 40, wherein the muting pattern parameter specifies a measurement interval in which to have at least two identical unmuted transmissions.

51. The storage medium of claim 40, wherein the one or more positioning reference signal criteria specify a muting pattern effect for the positioning reference signal muting pattern to have.

52. The storage medium of claim 40, wherein the instructions configured to cause the processor to produce the positioning reference signal muting pattern are configured to cause the processor to produce a first binary bit sequence and to produce a second binary bit sequence that is a cyclic shift of the first binary bit sequence.

* * * * *